(12) United States Patent
Chalich

(10) Patent No.: US 7,886,765 B2
(45) Date of Patent: Feb. 15, 2011

(54) LIVING-HINGE AIR VENT VALVE

(76) Inventor: Wayne D. Chalich, 11072 Temple Ave., Seminole, FL (US) 33772

(*) Notice: Subject to any disclaimer, the term of this patent is extended or adjusted under 35 U.S.C. 154(b) by 321 days.

(21) Appl. No.: 11/855,617

(22) Filed: Sep. 14, 2007

(65) Prior Publication Data

US 2009/0071551 A1 Mar. 19, 2009

(51) Int. Cl.
*F16K 17/32* (2006.01)
(52) U.S. Cl. .................... 137/526; 137/217
(58) Field of Classification Search ............... 137/526, 137/527, 516.11, 216, 215, 217, 218, 382, 137/377, 512, 512.1, 512.15
See application file for complete search history.

(56) References Cited

U.S. PATENT DOCUMENTS

| | | | | |
|---|---|---|---|---|
| 2,877,792 A * | 3/1959 | Tybus | ...................... | 137/512.1 |
| 3,295,547 A * | 1/1967 | Scaramucci | ............ | 137/315.33 |
| 3,831,628 A * | 8/1974 | Kintner et al. | .......... | 137/512.15 |
| 4,518,014 A * | 5/1985 | McAlpine | .................. | 137/843 |
| 4,867,802 A * | 9/1989 | Earl | ............................ | 137/526 |
| 5,364,244 A * | 11/1994 | Taylor-McCune et al. | ... | 417/536 |
| 6,234,198 B1 | 5/2001 | Chalich | | |
| 6,532,988 B1 * | 3/2003 | Ericson | ................. | 137/516.11 |
| 6,782,916 B2 * | 8/2004 | Svendsen et al. | ......... | 137/527.8 |
| 6,799,600 B2 * | 10/2004 | O'Neal | ........................ | 137/382 |
| 6,823,905 B1 * | 11/2004 | Smith et al. | ................... | 141/68 |
| 7,140,388 B2 | 11/2006 | Chalich | | |
| 7,201,190 B2 * | 4/2007 | Warning | ..................... | 137/899 |

* cited by examiner

*Primary Examiner*—Stephen M Hepperle
*Assistant Examiner*—Macade Brown
(74) *Attorney, Agent, or Firm*—Larson & Larson, P.A.; Frank Liebenow; Justin Miller

(57) ABSTRACT

An application for a living-hinge air vent valve connectable to a sewer conduit includes a base and a cover sealed to the base forming a cavity between the cover and the base. A fluid inlet shaft depends from a roof of the base and is connected to external air passages passing through a side of the base and through vents in a side of the cover. A living-hinge flapper is situated above the fluid inlet shaft and within the cavity. The living-hinge flapper allows air to flow from the fluid inlet shaft into the cavity and prevents sewerage gasses from flowing from the cavity out through the fluid inlet shaft. One or more connecting shafts in the base fluidly connect the cavity with a sewer system.

6 Claims, 4 Drawing Sheets

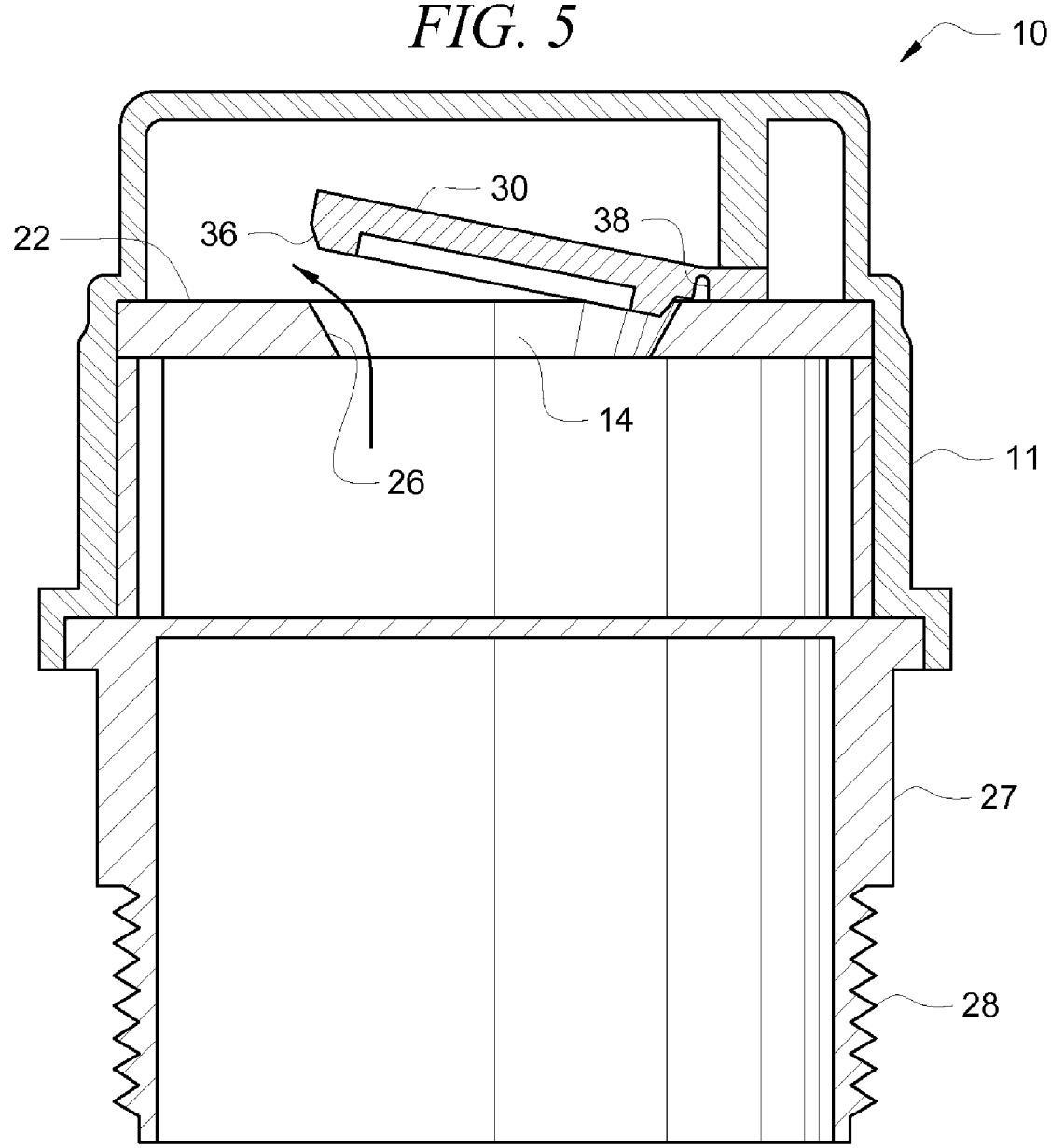

LIVING-HINGE AIR VENT VALVE

FIELD OF THE INVENTION

The present invention relates to air vent valves to relieve a vacuum developed in conduits. More particularly, it refers to a living-hinge valve for vacuum relief of domestic sewage piping systems in residential, commercial, industrial and institutional buildings.

BACKGROUND OF THE INVENTION

A single ball valve air vent is described in U.S. Pat. No. 6,234,198 to Chalich. Such a valve has received widespread commercial acceptance and is adequate to carry out its intended purpose. However, for large sewer pipes with drainage from multiple commodes a single air flow channel may not be adequate. For this reason the search continues for more efficient air flow in air vent valves.

U.S. Pat. No. 7,140,388 to Chalich describes a dual ball valve air vent having two independent ball valves and providing multiple air flow channels.

What is needed is an air vent valve that performs as well as the single or dual ball air valve vents but utilizes a living-hinge valve to replace the ball valve(s).

SUMMARY OF THE INVENTION

In one embodiment, a living-hinge air vent valve connectable to a sewer conduit is disclosed including a base and a cover sealed to the base. A fluid inlet shaft depends from a roof of the base and is in fluid communication with external air passages. The external air passages pass through a side of the base and through vents in a side of the cover. A living-hinge flapper is situated above the fluid inlet shaft allowing air flow from the fluid inlet shaft and preventing fluid/gas flow towards the fluid inlet shaft. One or more fluid connecting shafts pass through the base, fluidly connecting an area over the living-hinge flapper with a sewer system.

In another embodiment, a living-hinge air vent valve connectable to a sewer conduit is disclosed including a base and a cover sealed to the base. A passage for accepting outside air depends from a roof of the base. A living-hinge flapper is situated above the passage for accepting outside air and allows air flow from the passage for accepting outside air and it prevents gas flow towards the passage for accepting outside air. There are one or more passages for fluidly connects an area over the living-hinge flapper with a sewer system.

In another embodiment, a living-hinge air vent valve connectable to a sewer conduit is disclosed including a base and a cover sealed to the base forming a cavity between the cover and the base. A fluid inlet shaft depends from a roof of the base and is connected to external air passages passing through a side of the base and through vents in a side of the cover. A living-hinge flapper is situated above the fluid inlet shaft and within the cavity. The living-hinge flapper allows air to flow from the fluid inlet shaft into the cavity and prevents sewerage gasses from flowing from the cavity out through the fluid inlet shaft. One or more connecting shafts in the base fluidly connect the cavity with a sewer system.

BRIEF DESCRIPTION OF THE DRAWINGS

The invention can be best understood by those having ordinary skill in the art by reference to the following detailed description when considered in conjunction with the accompanying drawings in which:

FIG. 5 is a cross sectional view along line 3-3 of FIG. 2 with the living-hinge valve shown open.

DETAILED DESCRIPTION OF THE INVENTION

Figure 1:
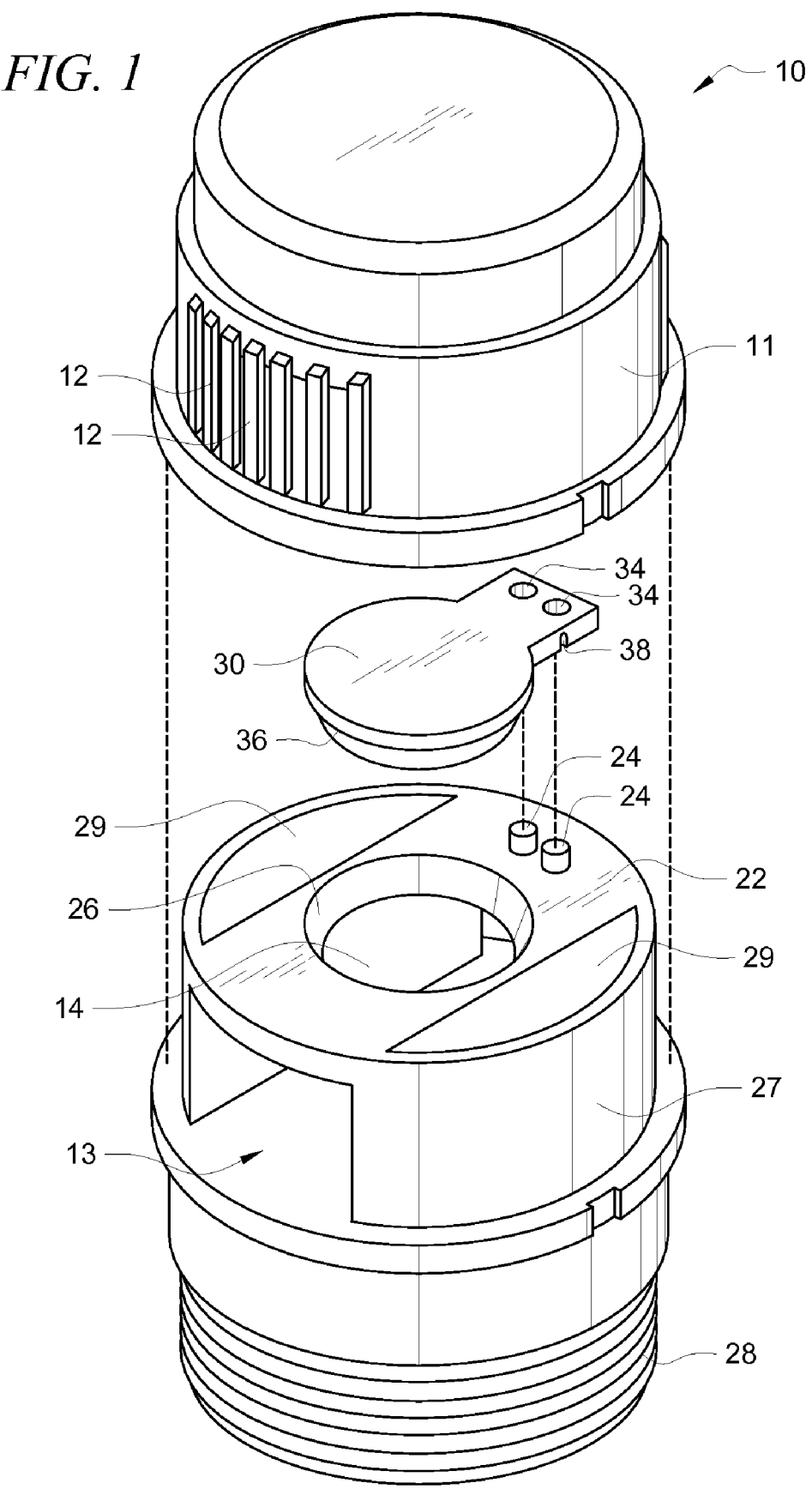
FIG. 1 is an exploded view of the elements of the living-hinge valve air vent valve.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an exploded view of the elements of the living-hinge valve air vent valve 10 will be described. The valve base 27 is shown with threads 28 for fastening to a sewer system conduit, for example, a PVC T-coupling with a threaded interface. In alternate embodiments, the valve base 27 has a non-threaded end having an outer diameter slightly smaller than the inner diameter of a standard sized PVC coupling such as a PVC T-coupling and the valve base 27 is glued to the PVC-T coupling as known in the industry (not shown).

The living-hinge valve air vent valve 10 has fluid connecting shafts 29 in fluid communication with the sewer system. When sewer gasses from the sewer system create pressure, they travel up through the fluid connecting shafts 29 and push against the living-hinge flapper 30 which is hinged with a living-hinge 38 over an inlet shaft 14 in the roof 22 of the base 27. One or more studs 24 pass through holes 34 in the living-hinge flapper 30, holding the living-hinge flapper 30 to the roof 22 of the base 27. The gas pressure from the sewer system firmly seats the living-hinge flapper 30 to the fluid inlet shaft 14 in the roof 22 of the base 27, thereby preventing the sewer gasses from escaping. Although not required, in a preferred embodiment, the bottom of the living-hinge flapper 30 is tapered 36, with a matching taper 26 in the shaft 14, providing increased surface area contact and a better seal.

When a vacuum occurs in the sewer system possibly due to the passing of a blockage such as solid waste, the vacuum pulls air through the fluid connecting shafts 29 and pulls upward on the living-hinge flapper 30 which results in the living-hinge flapper 30 lifting to allow outside air to enter from vents 12 in the cover 11, the air flowing through an inlet channel 13 to the fluid inlet shaft 14 beneath the living-hinge flapper 30 and, eventually through the fluid connecting shafts 29 and into the sewer system. Once the vacuum subsides, the living-hinge flapper 30 reseats itself by way of the living-valve hinge 38 spring-action and gravity pulling the living-hinge flapper 30 downward, thereby preventing the sewer gasses from escaping.

Figure 2:
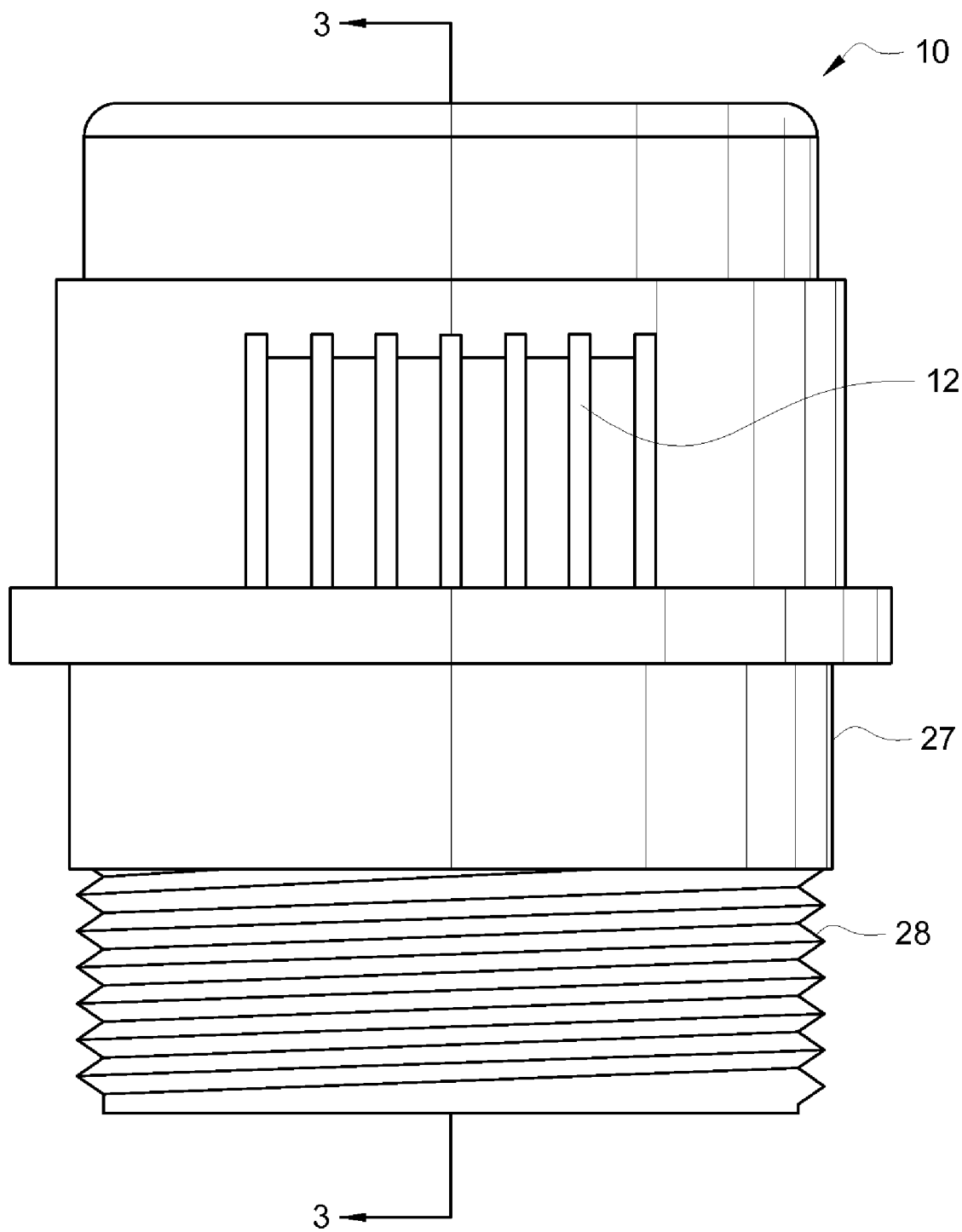
FIG. 2 is a plan view of the living-hinge valve air vent valve.

Referring to FIG. 2, a plan view of the living-hinge valve air vent valve 10 shown assembled will be described. The valve base 27 is shown with threads 28 for fastening to a sewer system conduit as known in the industry, for example, a PVC T-coupling with a threaded interface. In alternate embodiments, the valve base 27 has a non-threaded end having an outer diameter slightly smaller than the inner diameter of a standard sized PVC coupling such as a PVC T-coupling and the valve base 27 is glued to the PVC-T coupling as known in the industry (not shown). The intake air vents 12 are visible.

Figure 3:
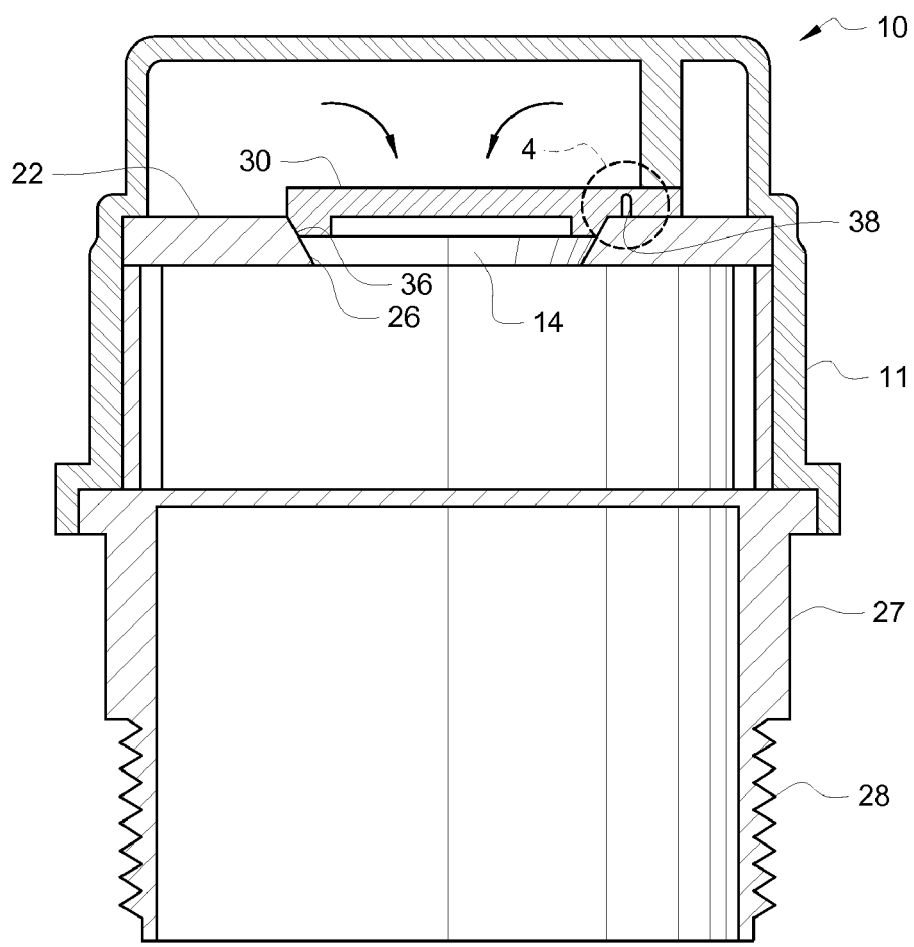
FIG. 3 is a cross sectional view along line 3-3 of FIG. 2 with the living-hinge valve shown seated.

Referring to FIG. 3, a cross sectional view along line 3-3 of FIG. 2 with the living-hinge valve 10 shown seated will be described. The valve base 27 is shown with threads 28 for fastening to a sewer system conduit as known in the industry, for example, a PVC T-coupling with a threaded interface. In alternate embodiments, the valve base 27 has a non-threaded end having an outer diameter slightly smaller than the inner diameter of a standard sized PVC coupling such as a PVC T-coupling and the valve base 27 is glued to the PVC-T coupling as known in the industry (not shown). The cover 11 is shown in place. In some embodiments, the cover is sealed to the base 27 with glue or a weld while in other embodiments; a tight fit seals the cover 11 to the base 27.

When sewer gasses from the sewer system create pressure, they travel up through the fluid connecting shafts 29 (see FIG. 1) and push against the living-hinge flapper 30 which is hinged with a living-hinge 38 to roof 22 of the base 27. One or more studs 24 pass through holes 34 in the living-hinge flapper 30 (see FIG. 1), holding the living-hinge flapper 30 to the roof 22 of the base 27. A pressure-fit holds the living-hinge flapper 30 to the studs 24. The sewer gas pressure firmly seats the living-hinge flapper 30 to the roof 22 of the base 27, thereby preventing the sewer gasses from escaping out though the fluid inlet shaft 14. Although not required, in a preferred embodiment, the bottom of the living-hinge flapper 30 is tapered 36, with a matching taper 26 in the fluid inlet shaft 14 in the roof 22 of the base 27, providing increased surface area contact and a better seal.

Figure 4:
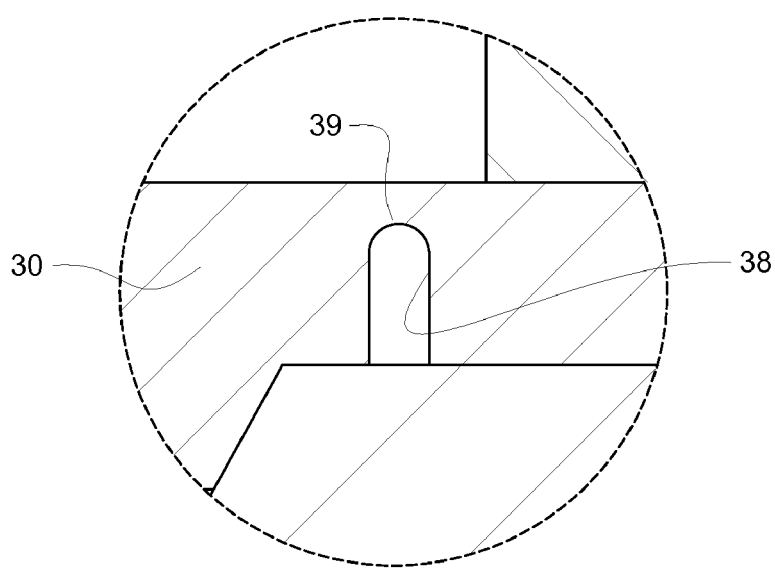
FIG. 4 is a magnified cross sectional view of the living-hinge from FIG. 3.

Referring to FIG. 4, a magnified cross sectional view of the living-hinge from FIG. 3 will be described. The living-hinge 38 is an area of lesser material than the rest of the living-hinge flapper 30, thereby providing a hinge-point 39 at which the living-hinge flapper 30 bends upwardly under air pressure. The living-hinge flapper 30 is preferably made from a stiff, bendable material such as a hard rubber, thereby facilitating the bending of the living-hinge at the hinge-point when outside air pressure is greater than the sewer line pressure (e.g., a vacuum in the sewer line.

Referring to FIG. 5, a cross sectional view along line 3-3 of FIG. 2 with the living-hinge valve 10 shown open will be described. When a vacuum occurs in the sewer system possibly due to the passing of a blockage such as solid waste, the vacuum pulls air through the channels 29 (see FIG. 1) and pulls upward on the living-hinge flapper 30 which results in the living-hinge flapper 30 lifting to allow outside air to enter from vents 12 in the cover 11 (see FIG. 1), the air flowing through an inlet channel 13 (see FIG. 1) to the fluid inlet shaft 14 beneath the living-hinge flapper 30 and, eventually through the fluid connecting shafts 29 (see FIG. 1) and into the sewer system. Once the vacuum subsides, the living-hinge flapper 30 reseats itself by means of the living-valve hinge 38 spring-action and gravity pulling the living-hinge flapper 30 downward, thereby preventing the sewer gasses from escaping. Although not required, in a preferred embodiment, the bottom of the living-hinge flapper 30 is tapered 36, with a matching taper 26 in the base 22, providing increased surface area contact and a better seal.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A living-hinge air vent valve connectable to a sewer conduit, the living-hinge air vent valve comprising:
    a base, the base having at least one stud;
    a cover sealed to the base, the cover forming a cavity between the cover and the base;
    a fluid inlet shaft depending from a roof of the base, the fluid inlet shaft in fluid communication with external air passages passing through a side of the base and passing through vents in a side of the cover;
    a living-hinge flapper situated above the fluid inlet shaft and within the cavity, the living-hinge flapper allowing air to flow from the fluid inlet shaft into the cavity and preventing sewerage gasses from flowing from the cavity into the fluid inlet shaft, the living-hinge flapper having at least one hole, each of the at least one hole interfaced to the at least one stud, thereby holding the living-hinge flapper to the base, wherein a lower surface of the living-hinge flapper is tapered and an upper surface of the fluid inlet shaft is tapered to mate with the lower surface of the living hinge flapper; and
    one or more connecting shafts in the base, the fluid connecting shafts fluidly connecting the cavity with a sewer system.

2. The living-hinge air vent valve of claim 1, wherein the living-hinge flapper has at least one mounting hole and the roof of the base has at least one mounting peg, the mounting holes fitting snuggly over the mounting pegs, thereby holding the living-hinge in place over the fluid inlet shaft.

3. The living-hinge air vent valve of claim 1, wherein a bottom portion of the base is tubular and sized such that an outer diameter of the base is slightly smaller than an inner diameter of a sewerage pipe of the sewerage system, allowing the bottom portion of the base to be inserted into the sewerage pipe thereby fluidly connecting the sewerage system with the connecting shafts.

4. The living-hinge air vent valve of claim 1, wherein a bottom portion of the base is tubular and has thread such that the threads of the bottom portion of the base mate with mating threads within a sewerage pipe of the sewerage system, allowing the bottom portion of the base to be threaded into the mating threads of the sewerage pipe thereby fluidly connecting the sewerage system with the connecting shafts.

5. The living-hinge air vent valve of claim 1, wherein the cover is sealed to the base using glue.

6. The living-hinge air vent valve of claim 1, wherein the living-hinge flapper is urged into the closed position by both resilient force of the living-hinge flapper and by gravity.

* * * * *